United States Patent Office  3,314,900
Patented Apr. 18, 1967

3,314,900
PHOSPHORUS POLYMERS
Eugene H. Uhing, Chicago Heights, Ill., assignor to Stauffer Chemical Company, New York, N.Y., a corporation of Delaware
No Drawing. Filed Apr. 28, 1965, Ser. No. 451,611
1 Claim. (Cl. 260—2)

This invention is directed to novel phosphorus compounds. More particularly, this invention is concerned with novel phosphorus polymers.

Up to the present time, there has been very little work on heterochain polymers with phosphorus in the main chain because of (1) the unavailability of phosphorus intermediates, and (2) the lack of knowledge on their preparation.

It is an object of this invention to provide novel phosphorus polymers.

It is a further object to provide a process for their preparation.

Other objects will be apparent from the explanation which follows.

I have now discovered polymeric phosphorus compounds of the formula $$\left[ \begin{array}{c} H \quad O \\ | \quad \| \\ -C-P- \\ | \quad | \\ H \quad OR \end{array} \right]_n$$

wherein R is a hydrogen atom or hydrocarbon radical free of ethylenic and acetylenic unsaturation and containing from 1–8 carbon atoms, and $n$ is an integer of from about 20 to 10,000. The novel compounds of this invention are made by treating an aliphatic ester of a halomethylenephosphonous dihalide, said ester having the formula $$\begin{array}{c} H \\ | \\ X-C-P-(OR)_2 \\ | \\ H \end{array}$$

wherein X is a halogen preferably chlorine or bromine, and R is as previously defined; with a free radical catalyst such as light, oxygen or a peroxide. The temperature should be below 50° C., preferably from about 0° to 50° C. After the polymerization has been initiated, the temperature may be raised above 50° C. (i.e., about 50° C. to 200° C. depending upon the chain length of the aliphatic ester) to distill off the lower boiling alkyl chloride formed. This reaction may be carried out without any catalyst, but one of the catalysts mentioned hereinabove is preferred, in order to inhibit the formation of a side product of the formula $$\begin{array}{c} O \\ \| \\ R-P-OR \\ | \\ H-C-H \\ | \\ X \end{array}$$

wherein R and X are as hereinabove defined.

The aliphatic ester intermediate useful in making the polymeric compounds of this invention may be produced by the reaction of halophosphine with a monohydric alcohol according to the following reaction:

$$\begin{array}{c} H \\ | \\ X-C-PX_2 + 2ROH + \text{"acceptor"} \longrightarrow \\ | \\ H \end{array}$$

$$\begin{array}{c} H \\ | \\ XCP(OR)_2 + 2HX\cdot\text{"acceptor"} \\ | \\ H \end{array}$$

wherein X and R are as previously defined and the "acceptor" is a hydrogen halide acceptor. Suitable alcohols for use in the invention are those having from 1 to 8 carbon atoms and would include methanol, ethanol, propanol, isopropanol, butanol, octanol, and the like. When the above reaction is conducted with a lower alcohol, i.e., methanol, ethanol, etc., the aliphatic ester product is unstable and polymerizes to form the novel compounds of this invention. Because of the unstable nature of the aliphatic ester intermediate, the reaction shown above should be run in an oxygen-free atmosphere such as a nitrogen atmosphere so that the phosphorus atom is not oxidized to its pentavalent state where polymerization is impossible. I have found, however, that when the aliphatic ester intermediate is formed, its polymerization may be catalyzed by the addition of light, oxygen or a peroxide, preferably dibenzoyl peroxide. Other suitable peroxides would include dilauroyl, α,α'-dinaphthoyl, and diacetyl peroxide.

Both in the preparation of the novel polymer and the ester intermediate, it is desirable to run the reaction in the presence of a hydrogen halide acceptor, and a solvent which is inert to the reactants. Examples of the former are pyridine, picoline and triethylamine, which serve in tying up the HCl formed and consequently, prevent product degradation. If a hydrogen halide acceptor is not used, an excess of alcohol may be used to inhibit product deterioration. Examples of solvents would include diethyl ether, benzene, dioxane, hexane, dichlorobenzene and the like, but none is required if an excess of alcohol is used.

An alternative process for preparing the ester intermediate involves the well-known reaction of a halophosphine with an epoxide such as ethylene oxide, according to the following reaction $$\begin{array}{c} H \quad X \\ | \quad / \\ X-C-P \\ | \quad \backslash \\ H \quad X \end{array} + 2H_2C\overset{O}{\underset{}{\diagup\diagdown}}CH_2 \longrightarrow \begin{array}{c} H \quad OCH_2CH_2X \\ | \quad / \\ X-C-P \\ | \quad \backslash \\ H \quad OCH_2CH_2X \end{array}$$

wherein R and X are as hereinabove defined. This latter process obviates the use of a hydrogen halide acceptor since no hydrogen halide is liberated, and a solvent is unnecessary when the reaction is run at temperatures of from about 0° C. to 10° C.

The following examples are illustrative of the invention, but should not be considered as limitations thereof:

*Example 1*

$$Cl-CH_2-P\begin{array}{c} Cl \\ \diagdown \\ Cl \end{array}$$

To a 2 liter three-necked reaction flask fitted with a thermometer, stirrer and reflux condenser were added 639 grams (3.5 moles) of chloromethylphosphonodichlorothionate and 690 grams (3.85 moles) of phosphonyl chloride. The mixture was then maintained at a temperature between 175° C. and 180° C. for two hours under reflux and then cooled to room temperature. The residue was vacuum distilled at 100 mm. Hg to yield 510 grams of crude product having a boiling point between 80° C. and 130° C. The crude product was redistilled through a 20 inch Vigreaux column at atmospheric pressure to give 415 grams (78.5% yield) of chloromethylphosphine dichloride boiling at about 127° C. to 131° C.

*Example 2*

$$\left[ \begin{array}{c} O \\ \| \\ -CH_2P- \\ | \\ OC_2H_4Cl \end{array} \right]_n$$

To a reactor flask fitted with a stirrer, thermometer and dropping funnel and containing 152 grams (1 mole) of chloromethylphosphonous dichloride was added 91 grams (2.1 moles) of ethylene oxide while maintaining the temperature of the reaction between 1° C. and 5° C. Two hundred and thirty grams of O-dichlorobenzene was added and the temperature of the mixture was maintained below 10° C. for one hour by means of an ice bath. The ice bath was removed and the flask flushed with dry air to catalyze the reaction. The temperature then rose above room temperature so that the mixture was again placed in an ice bath intermittently in order to maintain the temperature of the reaction at 25° C. for an additional hour. The ice bath was removed and the temperature of the mixture was slowly warmed to 100° C. over a one hour period and then heated to 150° C. and maintained at that temperature for 30 minutes. A thick jelly product formed which was separated from the solvent by decanting. This semisolid product was dried under vacuum at 150° C. to yield 115.4 grams of residue. The decanted solvent was evaporated at 0.5 mm. of Hg pressure at 108° C. to give 36.0 grams of residue. Of the total 151.4 grams of residue recovered, 25 grams was washed with diethylether, filtered, the filtrate evaporated to dryness, and the precipitate combined to yield 18 grams of poly-β-chloroethylmethylenephosphinate having an analysis of 20.4% P and 27.0% Cl as compared to 22.0% P and 25.2% Cl, theoretical.

*Example 3*

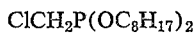
ClCH$_2$P(OC$_8$H$_{17}$)$_2$

To a reactor flask fitted with a stirrer, reflux condenser, dropping funnel, and kept under a nitrogen atmosphere, was placed 40 grams (0.5 mole) of pyridine, 67.5 grams (0.5 mole) of octanol and 300 ml. of benzene. By way of the dropping funnel 38 grams (0.25 mole) of chloromethylphosphonous dichloride was added while maintaining the temperature of the reaction between 10° C. and 15° C. After the addition was complete, the mixture was allowed to warm to room temperature and then filtered by means of a filter stick to keep the product under a nitrogen atmosphere. The precipitate was washed twice with 300 ml. of benzene and the filtrate was concentrated to give a total of 80.7 grams (96% yield) of dioctyl chloromethylphosphonite. This material was sealed under nitrogen and a substantial portion polymerized on standing and exposure to light.

*Example 4*

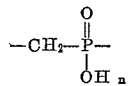

In a 500 ml., three-necked reaction flask fitted with a stirrer, dropping funnel, condenser and gas exit tube was placed 200 ml. diethylether, 24.8 grams (0.54 mole) of ethanol, 42.5 grams (0.54 mole) of pyridine and the system was flushed with nitrogen. By way of the dropping funnel was added 36.9 grams (0.25 mole) of chloromethylphosphonous dichloride dropwise while maintaining the reaction temperature at −20° C. After the addition was complete the reaction mixture was allowed to warm to room temperature and the flask was flushed with dry air. Some precipitate formed and the temperature of the reaction rose to about 40° C. causing the diethylether solvent to evaporate. Two hundred ml. of concentrated HCl (37% aqueous) was added and the mixture was refluxed for ten hours. The mixture was then cooled, filtered, and washed with 50 ml. of water to give 14.6 grams (77% yield) of polymethylenephosphinic acid.

The phosphorus polymers of this invention, because of their high thermal stability, are useful as flame resistant materials, additives to other flame resistant materials, hydraulic fluids, high temperature lubricators and, in their acid form, they may be used as ionic exchange resins.

From the foregoing it will be apparent to those skilled in the art that many modifications and variations may be made in the invention without departing from the true scope thereof.

Having thus described the invention, I claim:

A process for preparing phosphorus polymers corresponding to the general formula

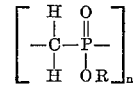

wherein R is selected from the group consisting of hydrogen and hydrocarbon radicals free of ethylenic and acetylenic unsaturation and containing from one to eight carbon atoms, and $n$ is an integer of from about 20 to about 10,000, which comprises contacting a compound of the formula

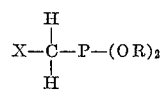

wherein X is a halogen selected from the group consisting of chlorine and bromine and R is as previously defined, with a free radical catalyst selected from the group consisting of oxygen and a peroxide at a temperature below 50° C.

References Cited by the Examiner
UNITED STATES PATENTS
3,161,607  12/1964  Garner _____ 260—2

SAMUEL H. BLECH, *Primary Examiner.*

UNITED STATES PATENT OFFICE
CERTIFICATE OF CORRECTION

Patent No. 3,314,900                                                       April 18, 1967

Eugene H. Uhing

It is hereby certified that error appears in the above numbered patent requiring correction and that the said Letters Patent should read as corrected below.

Column 2, line 54, for "phosphonyl" read -- phosphenyl --; column 3, line 41, for "benezene" read -- benzene --.

Signed and sealed this 14th day of November 1967.

(SEAL)
Attest:

Edward M. Fletcher, Jr.

Attesting Officer

EDWARD J. BRENNER

Commissioner of Patents